(12) United States Patent
Chandra et al.

(10) Patent No.: US 9,418,343 B2
(45) Date of Patent: Aug. 16, 2016

(54) MULTISTAGE LEARNER FOR EFFICIENTLY BOOSTING LARGE DATASETS

(71) Applicant: Google Inc., Mountain View, CA (US)

(72) Inventors: Tushar Deepak Chandra, Los Altos, CA (US); Tal Shaked, Los Altos, CA (US); Yoram Singer, Palo Alto, CA (US); Tze Way Eugene Ie, San Francisco, CA (US); Joshua Redstone, Cambridge, MA (US)

(73) Assignee: Google Inc., San Francisco, CA (US)

( * ) Notice: Subject to any disclaimer, the term of this patent is extended or adjusted under 35 U.S.C. 154(b) by 284 days.

(21) Appl. No.: 14/142,977

(22) Filed: Dec. 30, 2013

(65) Prior Publication Data

US 2015/0186795 A1    Jul. 2, 2015

(51) Int. Cl.
*G06N 3/04*    (2006.01)
*G06N 99/00*    (2010.01)

(52) U.S. Cl.
CPC .................... *G06N 99/005* (2013.01)

(58) Field of Classification Search
CPC ....................................................... G06N 3/04
USPC ......................................................... 706/46
See application file for complete search history.

(56) References Cited

U.S. PATENT DOCUMENTS

2014/0079297 A1*   3/2014   Tadayon ................. G06K 9/00
                                                                382/118

OTHER PUBLICATIONS

Kohl and Stone, "Machine Learning for Fast Quadrupedal Locomotion," Appeared in The Nineteenth National Conference on Artificial Intelligence, 2004, pp. 611-616.
Livadas et al., "Using Machine Learning Techniques to Identify Botnet Traffic," Proceedings 2006 31st IEEE Conference on Local Computer Networks, Nov. 14-16, 2006, pp. 967-974.
Rennie, "ifile: An Application of Machine Learning to E-Mail Filtering," In Proc. KDD00 Workshop on Text Mining, Boston, 2000, 6 pages.
Richardson et al., "Beyond PageRank: Machine Learning for Static Ranking," WWW '06 Proceedings of the 15th international conference on World Wide Web, May 23-26, 2006, pp. 707-715.
Rüping, "Incremental Learning with Support Vector Machines," Technical Report TR-18, Universitat Dortmund, SFB475, 2002, 12 pages.

* cited by examiner

*Primary Examiner* — Stanley K Hill
*Assistant Examiner* — Ola Olude Afolabi
(74) *Attorney, Agent, or Firm* — Fish & Richardson P.C.

(57) ABSTRACT

Implementations of the disclosed subject matter provide methods and systems for using a multistage learner for efficiently boosting large datasets in a machine learning system. A method may include obtaining a first plurality of examples for a machine learning system and selecting a first point in time. Next, a second point in time occurring subsequent to the first point in time may be selected. The machine learning system may be trained using m of the first plurality of examples. Each of the m examples may include a feature initially occurring after the second point in time. In addition, the machine learning system may be trained using n of the first plurality of examples, and each of the n examples may include a feature initially occurring after the first point in time.

17 Claims, 3 Drawing Sheets

MULTISTAGE LEARNER FOR EFFICIENTLY BOOSTING LARGE DATASETS

BACKGROUND

In general, large-scale data processing systems process large amounts of data from various sources and/or machines using iterative batch learning algorithms. As a specific example, large-scale machine learning systems may process large amounts of training data from data streams received by the system. A data stream may include examples corresponding to specific instances of an event or action such as when a user selects a search query, or when a single video is viewed from among multiple videos presented to a user. An example may contain features (i.e., observed properties such as a user being located in the USA, a user preferring to speak English, etc.) and may also contain a label corresponding to a resulting event or action (e.g., a user selected a search result, a user did not select the search result, a user viewed a video, etc.). These examples may be used to generate statistics for each of the features. In particular, an iterative batch learning algorithm is typically used in a machine learning system, e.g., a boosting algorithm, and the algorithm may perform repeated iterations over training data to generate a model. Because a training dataset may be very large, these iterations can be expensive and it may be advantageous to develop techniques for optimizing the processing efficiency of these systems.

BRIEF SUMMARY

According to an embodiment of the disclosed subject matter, a method may include obtaining a first plurality of examples for a machine learning system and selecting a first point in time. Next, a second point in time occurring subsequent to the first point in time may be selected. The machine learning system may be trained using m of the first plurality of examples. Each of the m examples may include a feature initially occurring after the second point in time. In addition, the machine learning system may be trained using n of the first plurality of examples, and each of the n examples may include a feature initially occurring after the first point in time.

According to an implementation of the disclosed subject matter, a computer-implemented method may include obtaining a first plurality of examples for a machine learning system. A first point in time may be selected and a second point in time occurring subsequent to the first point in time may be selected. The machine learning system may be trained using m of the first plurality of examples and each of the m examples may include a feature initially occurring after the second point in time. The machine learning system may be trained using n of the first plurality of examples and each of the n examples may include a feature initially occurring after the first point in time. Additionally, the machine learning system may be trained using a second plurality of examples. At least one of the second plurality may include a feature initially occurring after the first point, and at least one of the second plurality may not include any feature initially occurring after the first point.

An implementation of the disclosed subject matter provides a system including a processor configured to obtain a first plurality of examples for a machine learning system. A first point in time may be selected and a second point in time occurring subsequent to the first point in time may be selected. Next, the machine learning system may be trained using m of the first plurality of examples. Each of the m examples may include a feature initially occurring after the second point in time. In addition, the machine learning system may be trained using n of the first plurality of examples, and each of the n examples may include a feature initially occurring after the first point in time.

An implementation of the disclosed subject matter provides a system including a processor configured to obtain a first plurality of examples for a machine learning system. A first point in time may be selected and a second point in time occurring subsequent to the first point in time may be selected. The machine learning system may be trained using m of the first plurality of examples and each of the m examples may include a feature initially occurring after the second point in time. The machine learning system may be trained using n of the first plurality of examples and each of the n examples may include a feature initially occurring after the first point in time. In addition, the machine learning system may be trained using a second plurality of examples. At least one of the second plurality may include a feature initially occurring after the first point, and at least one of the second plurality may not include any feature initially occurring after the first point.

Implementations of the disclosed subject matter provide methods and systems that provide a multistage learner for efficiently boosting large datasets in a machine learning system. The disclosed subject matter allows a machine learning system to focus on training over a subset of data, such as new data received by the system. This technique may result in faster convergence over new data, allow for training over less data, and increase the processing speed in a machine learning system. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
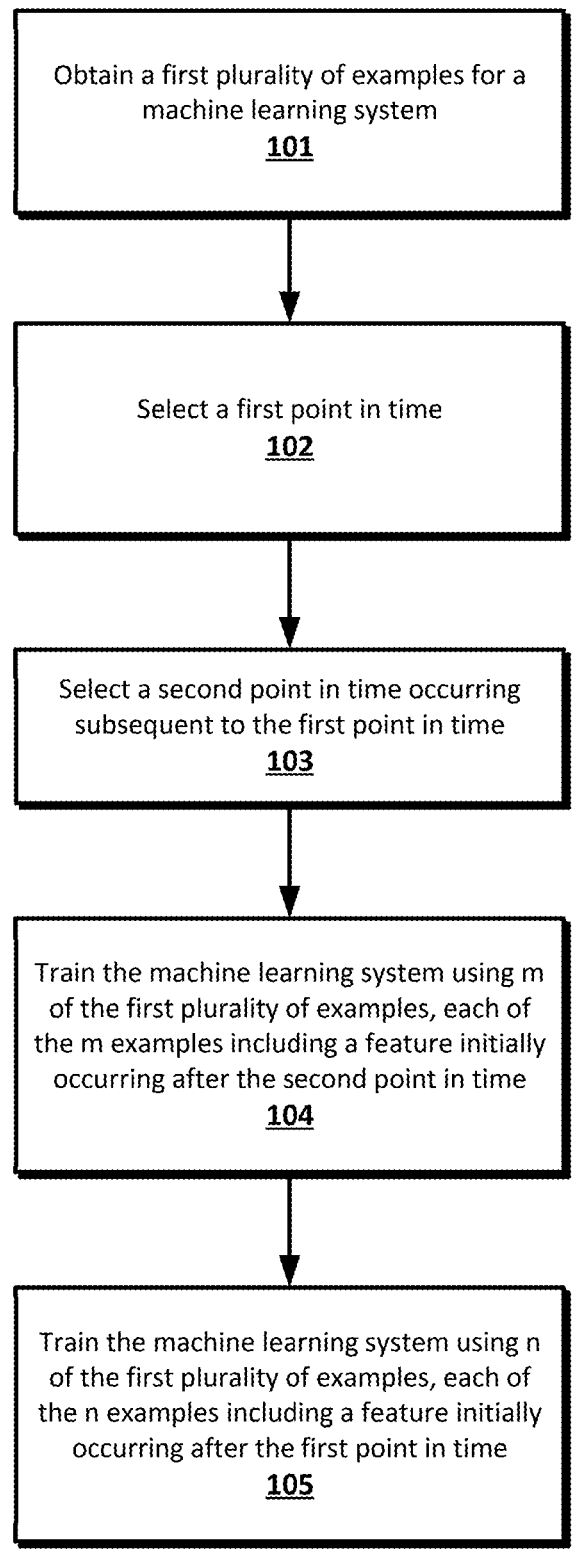
FIG. 1 shows an example process according to an implementation of the disclosed subject matter.

In general, large-scale data processing systems process large amounts of data from various sources and/or machines. As a specific example, large-scale machine learning systems may process large amounts of training data from data streams received by the system. A data stream may include examples corresponding to specific instances of an event or action such as when a user selects a search query, or when a single video is viewed from among multiple videos presented to a user. An example may contain features (i.e., observed properties such as a user being located in the USA, a user preferring to speak English, etc.) and may also contain a label corresponding to a resulting event or action (e.g., a user selected a search result, a user did not select the search result, a user viewed a video, etc.).

In general, a machine learning system may use a model to make predictions. Generating a model containing one or more weights associated with one or more features may be achieved using any iterative batch learning algorithm in which a solution is iteratively optimized. In particular, an algorithm may begin an iteration with an approximate solution, and based on the techniques disclosed herein to focus on training over a subset of data, such as new data received by the system, each iteration may result in a better approximation.

An example of a batch learning algorithm suitable for use with the techniques and systems disclosed herein is a parallel boosting algorithm. The present disclosure may also be implemented in and with a multitude of loss functions as well, such as log loss, squared loss, ranking, etc. Additionally, techniques disclosed herein may be implemented in a multitude of regularization techniques as well such as $L^1$-norm, $L^2$-norm, ridge regression and the like.

Parallel boosting techniques and other batch learning algorithms suitable for use in and with the present disclosure may be used in a machine learning system. A specific example of a machine learning system may contain one or more learners. An objective of a learner may be to generalize from its experience. For example, a learner may be able to make predictions and perform accurately on new, unseen examples/tasks after having been trained on a learning data set, such as received training examples. Training examples may be representative of the space of occurrences and the learner may build a model about the space that enables it to produce sufficiently accurate predictions in new cases.

A machine learning system may receive training data containing one or more examples. Generally, as disclosed herein, each example includes a label (e.g., that indicates the result of a given action or event such as a video view) and one or more features. A label may be feedback corresponding to the example such as a binary indication (e.g., 0 or 1, good or bad, spam or not spam, relevant or not relevant, clicked on or not clicked on, etc.). A feature may correspond to an individual measurable heuristic property of a phenomenon that may be observed and may either be present or not present. As specific examples, a feature may be a specific demographic property such as age (e.g., a 24 year old user), weight (e.g., 150 pounds), location (e.g., the United Kingdom), education (e.g., graduate degree), or the like; a user history property such as whether a specific link was selected, purchase history (e.g., a sweater bought from an online retailer), view history (e.g., a sweater recently viewed by the user), or the like; an association property such as an indication of whether a user is a member of a particular user group, whether a user is associated with a user account; the presence of a characteristic (e.g., keyword, a time associated with an action such as a when a purchase is made, etc.), or the like. As a specific illustrative sample, an example may correspond to a search query, "dog training book". The features associated with the search query may be the age, gender, and country corresponding to the user that submitted the search query. Alternatively or in addition, a feature associated with the search query may be a search result selected by a user from among a plurality of search results.

Based on the received training examples, a statistic may be generated for a feature based on weights previously associated with the feature. In a particular case, a statistic for a feature may indicate the frequency of examples received by the system that have both a specific label and the feature. Accordingly, a weight associated with the feature may be generated. As a result, a model containing at least the weight for the feature may be generated. It will be understood that one or more other weights associated with one or more other features may also be included in the model.

As in the specific example above, in order to generate a model, it may be necessary for the one or more learners to iterate over training data repeatedly. Incoming training data may include examples that include old features that the system has trained over for a long period of time. In addition, the incoming training data may also include examples that include new features that have never previously been received by the system. Rather than expending equal resources over old features and new features, it may be more efficient to allocate more system resources to training over the new features relative to old features. Old features may be distinguished from new features based on the time at which examples including a feature were first received by the system. In addition, the number of examples received by the system including an old feature may be larger than the number of examples received that include a new feature. For example, the number of examples including a feature "United States" indicating the location of a user may be greater than the number of examples including a new feature "video: 9848" indicating a new video that may have been viewed by a user. In this example, the feature "United States" may have been present in the system at a time before the time at which the feature "video:9848" appeared in the system. This may occur, for example, because the feature "video:9848" relates to a video in a collection of videos that has been recently added, and therefore has not been previously available for use in training examples used by the system.

The techniques described herein may be applied to multiple stages of learning; for example, each stage of learning may focus on training over a subset of features based on a time at which the subset of features was received by the system. For example, new features may be continuously received by a system. By allocating more system resources to processing these new features, the speed of convergence of the machine learning algorithm over the new features may be drastically improved. This technique of implementing multiple stages of learning, for example to focus on new features received by the system, may result in improved quality and overall efficiency of a machine learning system.

In general, implementations described herein allow the weights of any subset of the features received after a point in time to be made more accurate, and/or more efficiently derived, than would otherwise be feasible. The learner may train in an "online" setting where new example data, including new features, is constantly being received by the system. In an online setting, the training data repeatedly includes new features; however, the model generated tends to be most accurate regarding older features, which have been present in example data for some time, and least accurate regarding newer features. The present disclosure allows a learner to focus on new features and thereby enables the algorithm to converge more quickly with respect to the new features, which may lead to more accurate weights for the new features in the generated model.

For each iteration at one or more learners, a time may be selected and the learner may focus training over the particular features that were introduced to the system only after the selected time. Since the new features were introduced to the system after the selected time, training over the data received before the selected time may be unnecessary because it would not contribute to generating weights associated with the new features. In addition, it may also be beneficial or necessary to periodically run an iteration during which the system trains over all features across all days of example data. By including this iteration over all time and all features in the system, a parallel boosting algorithm as disclosed herein may be guaranteed to converge.

This technique of iterating over a particular selected time has a number of advantages. First, because training of the system is limited to the data received only after the selected time, the training data may be processed more quickly. In addition, the amount of data received after the selected time will be smaller in relation to the amount of data received over the life of the system. In particular, the number of features that must be processed by the system is directly related to the recency of the time selected, selecting a more recent time after which to train results in a lower number of new features to be trained over. For example, the number of features received over the last month typically is larger than the number of features received over the last week. As a result, by focusing the process on more recently received data, as opposed to all the data received during the life of the system, the algorithm may take larger boosting steps for each feature, thereby improving convergence.

This technique of iterating over a time period based on a selected time may be balanced by also iterating over a longer time period to ensure that the parallel boosting algorithm converges on older features as well. Accordingly, a technique may be to repeatedly run a schedule of iterations that includes at least one iteration that trains over the full time range of the system. As a specific example, the system may alternate between running one iteration over the full time range to process all the features received during the life of the machine learning system, and nine iterations processing the features received during the last week. Because the number of features received during the last week is significantly smaller than the number of features received during the life of the system, the computations performed by the system over the features received during the last week may be performed significantly faster than the computations performed by the system over the features received during the life of the system.

Implementations of the disclosed subject matter provide methods and systems for using a multistage learner for efficiently boosting large datasets. As described above, a machine learning system may include multiple learners, each of which trains some or all of a machine learning model based upon example data provided to the learner. Techniques disclosed herein may be repeated multiple times by a learner and/or may be performed by multiple learners. A system may include a processor configured to obtain multiple examples for a machine learning system. A first point in time may be selected and a second point in time occurring subsequent to the first point in time may be selected. The machine learning system may be trained using m of the multiple examples. Each of the m examples may include a feature initially occurring after the second point in time. In addition, the machine learning system may be trained using n of the multiple examples. Each of the n examples may include a feature initially occurring after the first point in time.

FIG. 1 shows an example process according to an implementation of the disclosed subject matter. A method may include obtaining multiple examples for a machine learning system, at 101. A first point in time may be selected at 102 and a second point in time occurring subsequent to the first point in time may be selected at 103. A point in time may refer to any time that may be selected during the life of a machine learning system. For example, a point in time may indicate a date and a time that may be selected out of the entire time a machine learning system has been in operation. At 104, the machine learning system may be trained using m of the multiple examples. Each of the m examples may include a feature initially occurring after the second point in time. At 105, the machine learning system may be trained using n of the multiple examples. Each of the n examples may include a feature initially occurring after the first point in time. For example, each of the m examples may include a new feature and each of the n examples may include an old feature as previously described. In most cases, the m examples may be a subset of the n examples, i.e., the n examples may include the m examples.

According to an implementation, a feature initially occurring after the second point in time may be different from a feature initially occurring after the first point in time. In some cases, a feature initially occurring after the first point in time may be an old feature and a feature initially occurring after the second point in time may be a new feature. A feature initially occurring after a point in time may refer to a feature that is received in an example for the first time after a point in time during the life of the system. For example, an example may be received at 09:38 am on Nov. 18, 2013 and the example may include a new feature "video:9848." This may be the first occurrence of the feature "video:9848" in the system, i.e., the system may have never previously received an example including the feature "video:9848." Thus, this example includes the feature "video:9848" initially occurring after the point in time 09:38 am on Nov. 18, 2013. The same example may also include the feature "United States" indicating where a user is located. It may be the case that the feature "United States" occurred in an example received by the system prior to Nov. 18, 2013. Thus, the feature "United States" did not initially occur after the point in time Nov. 18, 2013. As another example, an example A may have been received at 04:32 am on Dec. 3, 2008; the example may include a feature "India." This may have been the first occurrence of the feature "India" in an example received by the system. An example B may have been received at 05:23 am on Jun. 11, 2012; the example including a feature "keyword:gangnam." This may have been the first occurrence of the feature "keyword:gangnam" in an example received by the system. A selected first point in time may be Mar. 12, 2008 and a selected second point in time may be Jan. 20, 2012. Accordingly, example A may be an example including a feature (i.e., "India") initially occurring after the first point in time, i.e., the feature "India" initially occurred at 04:32 am on Dec. 3, 2008 which is after the first point in time Mar. 12, 2008. Similarly, example B may be an example including a feature (i.e., "keyword:gangnam") initially occurring after the second point in time, i.e., the feature "keyword:gangnam" initially occurred at 05:23 am on Jun. 11, 2012 which is after the second point in time Jan. 20, 2012.

Figure 2:
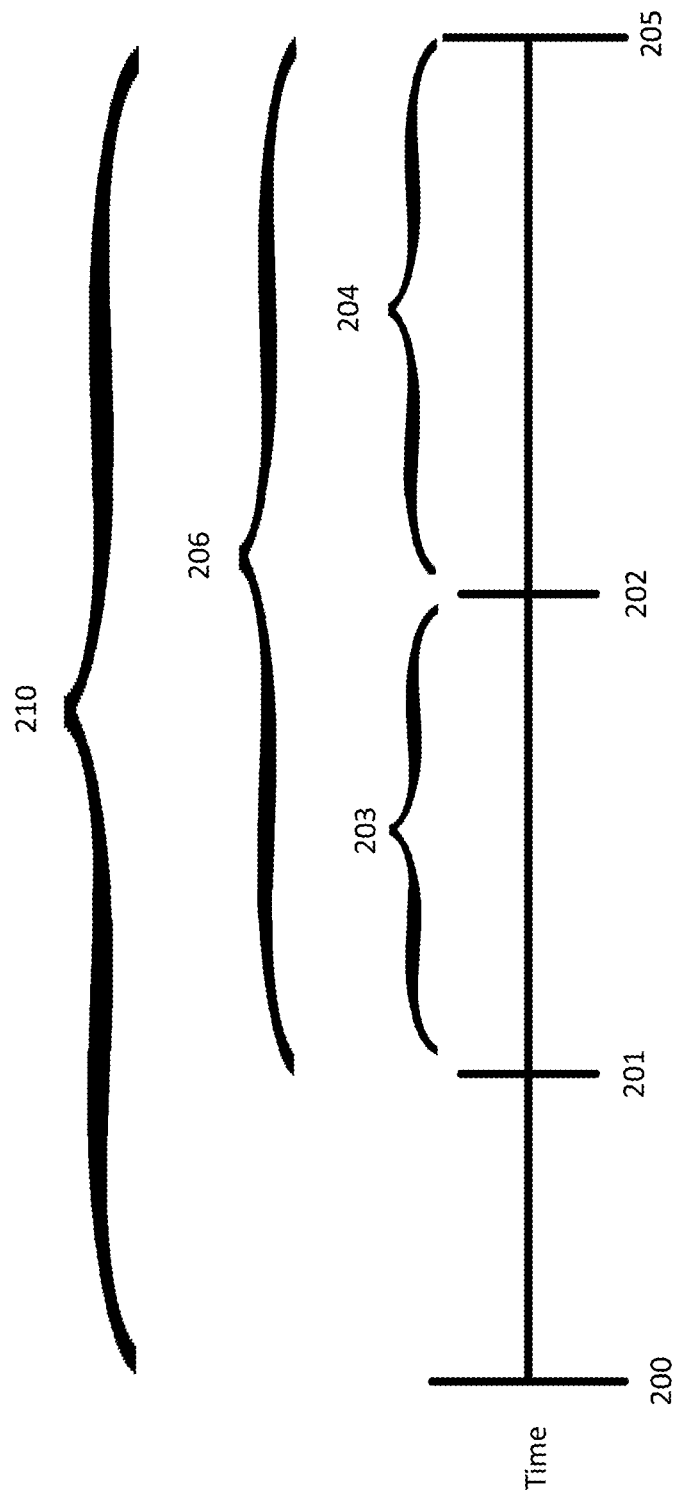
FIG. 2 shows an example timeline according to an implementation of the disclosed subject matter.

FIG. 2 shows an example timeline according to an implementation of the disclosed subject matter. A machine learning system may start receiving training data at a start time 200. The start time 200 may be a point in time at which the machine learning system started operating. A present time 205 may be the present time and the time period 210 which extends from the start time 200 to the present time 205 may be the life of the machine learning system. For example, time period 210 may represent all of the time during which the machine learning system has been processing data. A first point in time 201 may be a point in time occurring after the start time 200. A second point in time 202 may be a point in time occurring subsequent to the first point in time 201. A first time period 203 may be a time period starting at the first point in time 201 and extending to the second point in time 202. A second time period 204 may be a time period starting at the second point in time 202 and extending to the present time 205. A third time period 206 may be a time period starting at the first point in time 201 and extending to the present time 205. Although not shown in FIG. 2, the first point in time 201 may be the same as the start time 200. Additionally, the second time period 204 and/or the third time period 206 may extend to a third point in time (not shown) occurring before the present time 205.

According to an implementation, m may be greater than n such that the number of examples m that include a feature initially occurring after the second point in time is greater than the number of examples n that include a feature initially occurring after the first point in time. For example, during the time period 206, a system may receive 42,364 examples, each of these examples including a feature that initially occurred after the first point in time 201. In addition, during the time period 204, a system may have received 10,342 examples, each of these examples including a feature initially occurring after the second point in time 202. In particular, the 42,364 examples received during the time period 206 may include the subset of 10,342 examples received during the time period 204. In this case, the machine learning system may be trained using all of the 10,342 examples that include a feature that initially occurred after the second point in time 202 and less than 42,364 examples which include a feature that initially occurred after the first point in time 201. For example, the system may be trained using only the 10,342 examples that include a feature that initially occurred after the second point in time 202. As another example, the system may be trained using all of the 10,342 examples that include a feature that initially occurred after the second point in time 202, and 200 examples out of the 42,364 examples that include a feature that initially occurred after the first point in time 201. This technique may allow the machine learning system to focus on training over a higher number of examples including one or more newer features than examples including one or more older features.

In an implementation, a method may also include determining, for each of the m plurality of training examples, that the example includes a feature initially occurring after the second point in time. Similarly, a method may include determining, for each of the n plurality of training examples, that the example includes a feature initially occurring after the first point in time. In connection with the example above, out of the 10,342 examples received after the second point in time 202, it may be determined that 343 of these examples included a feature "ad:9832" which initially occurred after the second point in time 202. Further, out of the 42,364 examples received after the first point in time 201, it may be determined that 1,387 of these examples included a feature "video:65" which initially occurred after the first point in time 201. Accordingly, the machine learning system may be trained using all 343 examples that include the feature "ad:9832" and 120 examples that include the feature "video:65". In some cases, the examples that include a new feature A initially occurring after a second point in time may also include an old feature B that initially occurred after a first point in time. For example, the examples that include the new feature "ad:9832" may also include the old feature "video:65". In this scenario, the machine learning system may still be trained based on the examples including the new feature A regardless of the whether the examples also include old feature B. According to an implementation, all examples including old features that occurred before a specific point in time may be removed from the training data, allowing the machine learning system to train only on new features in examples occurring after the specific point in time. In some cases, an example may not include any new features and in this case this example may be removed from the training data altogether as this example does not include any features requiring training, i.e., the example may include old features on which the system has presumably been previously trained. Based on this technique, the machine learning system may focus training on a specific feature that initially occurred after a selected point in time.

In addition to training over a number of training examples m including a feature initially occurring after the second point in time, the machine learning system may also be trained over M iterations using only training examples including a feature initially occurring after the second point in time. Further, the machine learning system may be trained over N iterations using only training examples including a feature initially occurring after the first point in time. For example, during the time period 206, a system may receive 10,000 examples, each of these examples including a feature that initially occurred after the first point in time 201. In addition, during the time period 204, a system may have received 500 examples, each of these examples including a feature initially occurring after the second point in time 202. In this case, the machine learning system may be trained over 9 iterations using all of the 500 examples that include a feature that initially occurred after the second point in time 202. In addition, the machine learning system may be trained over 1 iteration using the 10,000 examples that include a feature that initially occurred after the first point in time 201. In some cases, M may be determined as a ratio compared to N, for example, for every 9 iterations using all of the 500 examples that include a feature that initially occurred after the second point in time, the system may be trained over 1 iteration using the examples that include a feature that initially occurred after the first point in time 201.

In an implementation, a first point in time 201 may be the same as the start time 200. In this case, the machine learning system may be trained over M iterations using only examples that include a feature that initially occurred after the second point in time 202 and N iterations using examples that include a feature that initially occurred after the start time 200. In this scenario, M>N. This technique may allow the machine learning system to be trained over more iterations based on new features that have initially occurred after the second point in time 202. For example, the machine learning system may be well trained for old features that occurred prior to the second point in time 202 and it may be unnecessary to continue training over these old features.

According to an implementation, a method may include training the machine learning system using multiple examples, with at least one of the examples including a feature initially occurring after the first point, and at least one example not including any feature initially occurring after the first point. For example, during the time period 210, i.e., the life of the machine learning system, 1,000,000,000 examples may be received by the machine learning system. These 1,000,000,000 examples may include features that initially occurred after a first point in time 201 as well as features that occurred prior to the first point in time 201. As a specific example, 1,000,000,000 examples may include an example that includes a feature "ad:163" which may have initially occurred after the first point in time 201. The 1,000,000,000 examples may also include an example that includes the features "United States", "English", "keyword:car", and "age:18-25", and all of these features may have occurred prior to the first point in time 201. This technique may allow the machine learning system to be trained over one or more iterations based on all features that have occurred during the time period 210, i.e., the life of the machine learning system.

Selection of a point in time may be based on a variety factors. For example, a point in time may be selected based on the time at which a feature may be first present in any example obtained for training the machine learning system. For example, an example may be received at 09:38 am on Nov. 18, 2013 and the example may include a new feature "video: 9848", i.e., the system may have never previously received an example including the feature "video:9848." As such, 09:38 am on Nov. 18, 2013 may be selected as a point in time based on the feature "video:9848" being first present in any example at 09:38 am on Nov. 18, 2013. As another example, a point in time may be selected based on the time at which a threshold number of features are first present in any example obtained to train the machine learning system. As such, a threshold number of features may be based on a setting such as a user setting, system setting, a default setting, and the like. For example, a threshold number of features may be set at 100 features present in any example received by the system. In this case, a point in time may be selected based on a time at which the system has received 100 new features. The system may track the number of new features occurring in examples received by the system. The point in time at which the $100^{th}$ new feature initially occurs in an example may be selected as a point in time.

In some instances, a point in time may be selected based on the time at which a threshold number of examples having a specific feature are obtained to train the machine learning system. As such, a threshold number of examples may be based on a setting such as a user setting, system setting, a default setting, and the like. An example may be received at 09:38 am on Nov. 18, 2013 and the example may include a new feature "video:9848", i.e., 09:38 am on Nov. 18, 2013 may be the point in time at which the feature "video:9848" is first present in any example received by the system. Beginning at 09:38 am on Nov. 18, 2013, the system may track the number of examples including the feature "video:9848". At 03:25 pm on Nov. 19, 2013, the $50^{th}$ example including the feature "video:9848" may be obtained to train the machine learning system, and accordingly, 03:25 pm on Nov. 19, 2013 may be selected as a point in time. According to an implementation, a point in time may be selected based upon the rate at which new features are added to the machine learning system. For example, the system may track the number of new features occurring in examples received by the system. When the rate at which new features are being received exceeds a new feature threshold rate, a point in time may be selected. As such, a new feature threshold rate may be based on a setting such as a user setting, system setting, a default setting, and the like. As a specific example, a new feature threshold rate may be set to 25% of all examples received within a 1 hour time period. Beginning at 02:15 pm to 03:14 pm on Oct. 23, 2013, the system may receive 200 examples. Out of these 200 examples, 60 examples may include one or more features that may be first present in any example received by the system. Accordingly, 03:14 pm on Oct. 23, 2013 may be selected as a point in time.

The techniques described herein may be applied to multiple stages of learning in a machine learning system. Each stage of learning may focus on training over a subset of features based on a time at which the subset of features was received by the system. In addition, each stage of learning may focus on training over a subset of features different from other stages of learning. As described herein, by allocating system resources to process new features received by the system, the speed of convergence of the machine learning algorithm over the new features may be drastically improved. Other advantages may include increased processing speed as well as reduced resource consumption by training the machine learning system over less.

Figure 3:
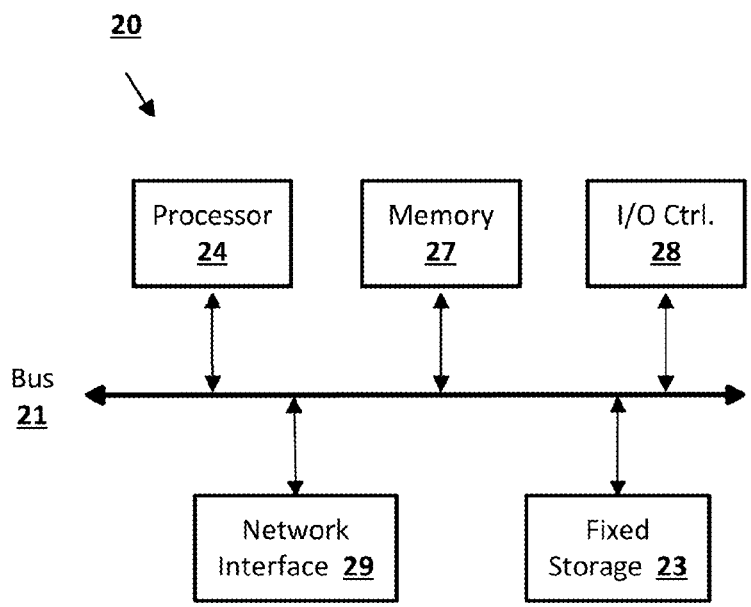
FIG. 3 shows a computer according to an embodiment of the disclosed subject matter.

Embodiments of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
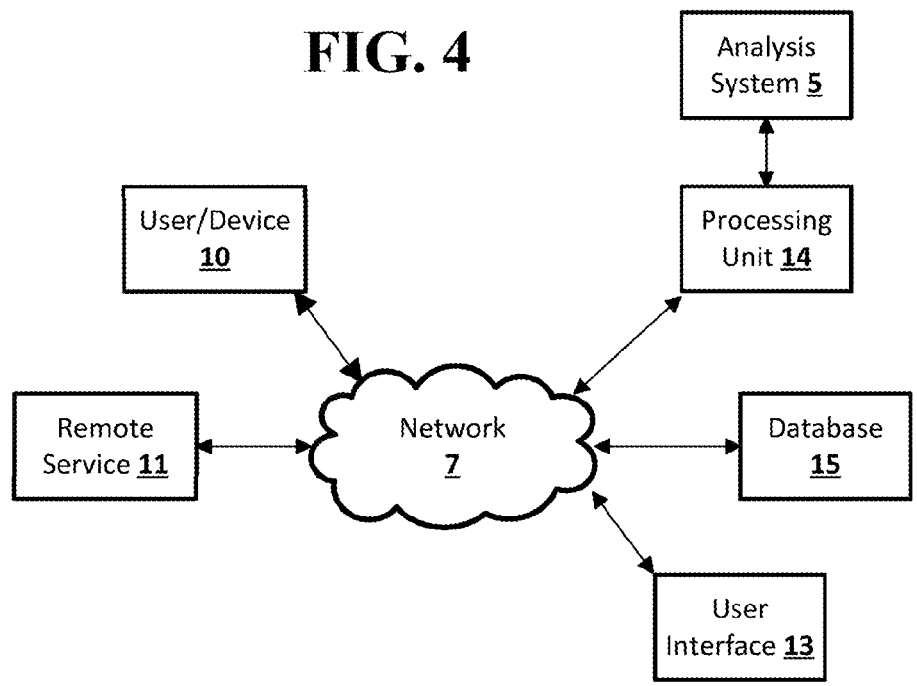
FIG. 4 shows a network configuration according to an embodiment of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
receiving a first plurality of examples for training a machine learning system, each example having a respective plurality of features, and each example being received at a respective time;
obtaining data defining a first point in time;
performing a first training iteration by training the machine learning system only on examples having at least one feature initially occurring after the first point in time;
obtaining data defining a second point in time occurring subsequent to the first point in time;
performing a second training iteration by training the machine learning system only on examples having a feature initially occurring after the second point in time; and
performing a third training iteration by training the machine learning system on a second plurality of examples, wherein at least one example of the second plurality has a feature initially occurring after the first point in time, and wherein at least one of the second plurality does not have any features initially occurring after the first point in time.

2. The method of claim 1, wherein a total number of examples on which the machine learning system is trained during the second training iteration m is greater than a total number of examples on which the machine learning system is trained during the first training iteration n.

3. The method of claim 1, further comprising determining, for each of the examples having at least one feature initially occurring after the second point in time, that the example includes a feature initially occurring after the second point in time.

4. The method of claim 1, further comprising determining, for each of the examples having at least one feature initially occurring after the first point in time, that the example includes a feature initially occurring after the first point in time.

5. The method of claim 1, further comprising selecting the first point in time based on the time at which a first feature is first present in any example obtained to train the machine learning system.

6. The method of claim 1, further comprising selecting the first point in time based on the time at which a threshold number of features are first present in any example obtained to train the machine learning system.

7. The method of claim 1, further comprising selecting the first point in time based on the time at which a threshold number of examples having a first feature are obtained to train the machine learning system.

8. The method of claim 1, further comprising selecting the first and second points in time based upon the rate at which new features are obtained to train the machine learning system.

9. A system comprising:
one or more computers and one or more storage devices storing instructions that when executed by the one or more computers cause the one or more computers to perform operations comprising:

receiving a first plurality of examples for training a machine learning system, each example having a respective plurality of features, and each example being received at a respective time;

obtaining data defining a first point in time;

performing a first training iteration by training the machine learning system only on examples having at least one feature initially occurring after the first point in time;

obtaining data defining a second point in time occurring subsequent to the first point in time;

performing a second training iteration by training the machine learning system only on examples having a feature initially occurring after the second point in time; and performing a third training iteration by training the machine learning system on a second plurality of examples, wherein at least one example of the second plurality has a feature initially occurring after the first point in time, and wherein at least one of the second plurality does not have any features initially occurring after the first point in time.

10. The system of claim 9, wherein a total number of examples on which the machine learning system is trained during the second training iteration m is greater than a total number of examples on which the machine learning system is trained during the first training iteration n.

11. The system of claim 9, the operations further comprising determining, for each of the examples having at least one feature initially occurring after the second point in time, that the example includes a feature initially occurring after the second point in time.

12. The system of claim 9, the operations further comprising determining, for each of the examples having at least one feature initially occurring after the first point in time, that the example includes a feature initially occurring after the first point in time.

13. The system of claim 9, wherein the operations further comprising selecting the first point in time based on the time at which a first feature is first present in any example obtained to train the machine learning system.

14. The system of claim 9, wherein the operations further comprising selecting the first point in time based on the time at which a threshold number of features are first present in any example obtained to train the machine learning system.

15. The system of claim 9, wherein the operations further comprising selecting the first point in time based on the time at which a threshold number of examples having a first feature are obtained to train the machine learning system.

16. The system of claim 9, wherein the operations further comprising selecting the first and second points in time based upon the rate at which new features are obtained to train the machine learning system.

17. One or more non-transitory computer storage media storing instructions that when executed by one or more computers cause the one or more computers to perform operations comprising:

receiving a first plurality of examples for training a machine learning system, each example having a respective plurality of features, and each example being received at a respective time;

obtaining data defining a first point in time;

performing a first training iteration by training the machine learning system only on examples having at least one feature initially occurring after the first point in time;

obtaining data defining a second point in time occurring subsequent to the first point in time;

performing a second training iteration by training the machine learning system only on examples having a feature initially occurring after the second point in time; and performing a third training iteration by training the machine learning system on a second plurality of examples, wherein at least one example of the second plurality has a feature initially occurring after the first point in time, and wherein at least one of the second plurality does not have any features initially occurring after the first point in time.

* * * * *